(12) United States Patent
Neal et al.

(10) Patent No.: US 8,904,332 B1
(45) Date of Patent: Dec. 2, 2014

(54) DISPLAY PROCESS

(71) Applicant: Cadence Design Systems, Inc., San Jose, CA (US)

(72) Inventors: Brett Allen Neal, Monument, CO (US); Joseph D Smedley, Chelmsford, MA (US); Richard Allen Woodward, Jr., San Diego, CA (US)

(73) Assignee: Cadence Design Systems, Inc., Armonk, NY (US)

( * ) Notice: Subject to any disclaimer, the term of this patent is extended or adjusted under 35 U.S.C. 154(b) by 0 days.

(21) Appl. No.: 13/782,571

(22) Filed: Mar. 1, 2013

(51) Int. Cl.
*G06F 17/50* (2006.01)

(52) U.S. Cl.
CPC .................................. *G06F 17/5068* (2013.01)
USPC ............................ 716/126; 716/113; 716/132

(58) Field of Classification Search
CPC ................................ G06F 17/50; G06F 9/455
USPC ........................................ 716/113, 126, 132
See application file for complete search history.

(56) References Cited

U.S. PATENT DOCUMENTS 7,627,838 B2 * 12/2009 Keswick ....................... 716/132

* cited by examiner

*Primary Examiner* — Thuan Do
(74) *Attorney, Agent, or Firm* — Holland & Knight LLP; Mark H. Whittenberger, Esq.

(57) ABSTRACT

The present disclosure relates to a method for visualizing an electronic circuit design. The method may include receiving the electronic circuit design, wherein the electronic circuit design includes at least one timing constraint. The method may also include identifying the at least one timing constraint and displaying, at a graphical user interface associated with the one or more computing devices, the at least one timing constraint and a physical routing associated with the electronic circuit design. The method may further include receiving a user input associated with the electronic circuit design and dynamically updating a graphical representation of the at least one timing constraint, in response to the received user input.

17 Claims, 21 Drawing Sheets

FIG. 6

DISPLAY PROCESS

FIELD OF THE INVENTION

The present disclosure relates to electronic design automation (EDA), and more specifically, to a method for visualizing one or more features of an electronic design.

DISCUSSION OF THE RELATED ART

EDA utilizes software tools that may be used in the design and analysis of numerous electronic systems such as printed circuit boards (PCBs) and integrated circuits (ICs). Recent years have seen unprecedented expansion of functional requirements for PCB designs. PCB designers must now cope with a myriad of interconnect topologies and logic signal levels, and must be constantly keen to tolerance stack-up and to implications to signal integrity of an evolving placement/interconnect solution. Designers must balance dozens of variables that may resolve into hundreds of valid and invalid solutions without any real guidance from the available tools toward selecting the best solution. EDA customers have responded to these shortcomings by demanding more route engine power, interactive functionality and diverse capabilities from their CAD tools. Currently, users solve difficult routing problems interactively through a manual CAD editing environment according to a tedious manual process. Certain connections are selected, some portion of the path for these connections is routed, problems are located and resolved, and the process is iterated until done. However, existing systems do not provide the user with all of the necessary data on the etch-edit canvas that helps users to develop a timing solution while working on the physical routing. EDA customers need to quickly understand where the trouble spots are, where additional space is going to be needed, as well as identify the timing relationships between routed signals.

SUMMARY OF INVENTION

In one or more embodiments of the present disclosure, a computer-implemented method for visualizing an electronic circuit design. The method may include receiving, at one or more computing devices, the electronic circuit design, wherein the electronic circuit design includes at least one timing constraint. The method may further include identifying the at least one timing constraint and displaying, at a graphical user interface associated with the one or more computing devices, the at least one timing constraint and a physical routing associated with the electronic circuit design. The method may also include receiving a user input associated with the electronic circuit design and dynamically updating a graphical representation of the at least one timing constraint, in response to the received user input.

One or more of the following features may be included. In some embodiments, displaying and the dynamic updating of the graphical representation is performed in a window of the graphical user interface. In some embodiments, the at least one timing constraint may include all of the timing constraints for a visualized portion of the electronic circuit design. The method may further include, in response to dynamically updating the graphical representation of the at least one timing constraint, dynamically updating one or more signals related to the at least one timing constraint. In some embodiments, dynamically updating the graphical representation may include changing a color associated with the at least one timing constraint. In some embodiments, dynamically updating the one or more signals may include changing a color associated with the one or more signals. The method may further include displaying at least one differential phase signal associated with the electronic circuit design.

In some embodiments, a computer-readable storage medium for electronic design simulation is provided. The computer-readable storage medium may have stored thereon instructions that when executed by a machine result in one or more operations. Operations may include receiving the electronic circuit design, wherein the electronic circuit design includes at least one timing constraint. Operations may further include identifying the at least one timing constraint and displaying, at a graphical user interface associated with the one or more computing devices, the at least one timing constraint and a physical routing associated with the electronic circuit design. Operations may also include receiving a user input associated with the electronic circuit design and dynamically updating a graphical representation of the at least one timing constraint, in response to the received user input.

One or more of the following features may be included. In some embodiments, displaying and the dynamic updating of the graphical representation is performed in a window of the graphical user interface. In some embodiments, the at least one timing constraint may include all of the timing constraints for a visualized portion of the electronic circuit design. Operations may further include, in response to dynamically updating the graphical representation of the at least one timing constraint, dynamically updating one or more signals related to the at least one timing constraint. In some embodiments, dynamically updating the graphical representation may include changing a color associated with the at least one timing constraint. In some embodiments, dynamically updating the one or more signals may include changing a color associated with the one or more signals. Operations may further include displaying at least one differential phase signal associated with the electronic circuit design.

In one or more embodiments of the present disclosure, a system may include a computing device having at least one processor configured to receive the electronic circuit design, wherein the electronic circuit design includes at least one timing constraint. The at least one processor may be further configured to identify the at least one timing constraint and displaying, at a graphical user interface associated with the one or more computing devices, the at least one timing constraint and a physical routing associated with the electronic circuit design. The at least one processor may be further configured to receive a user input associated with the electronic circuit design and dynamically updating a graphical representation of the at least one timing constraint, in response to the received user input.

One or more of the following features may be included. In some embodiments, displaying and the dynamic updating of the graphical representation is performed in a window of the graphical user interface. In some embodiments, the at least one timing constraint may include all of the timing constraints for a visualized portion of the electronic circuit design. The at least one processor may be further configured to, in response to dynamically updating the graphical representation of the at least one timing constraint, dynamically update one or more signals related to the at least one timing constraint. In some embodiments, dynamically updating the graphical representation may include changing a color associated with the at least one timing constraint. In some embodiments, dynamically updating the one or more signals may include changing a color associated with the one or more signals. The at least one processor may be further configured to display at least one differential phase signal associated with the electronic circuit design.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 6 is a schematic depicting aspects of the display process in accordance with an embodiment of the present disclosure;

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
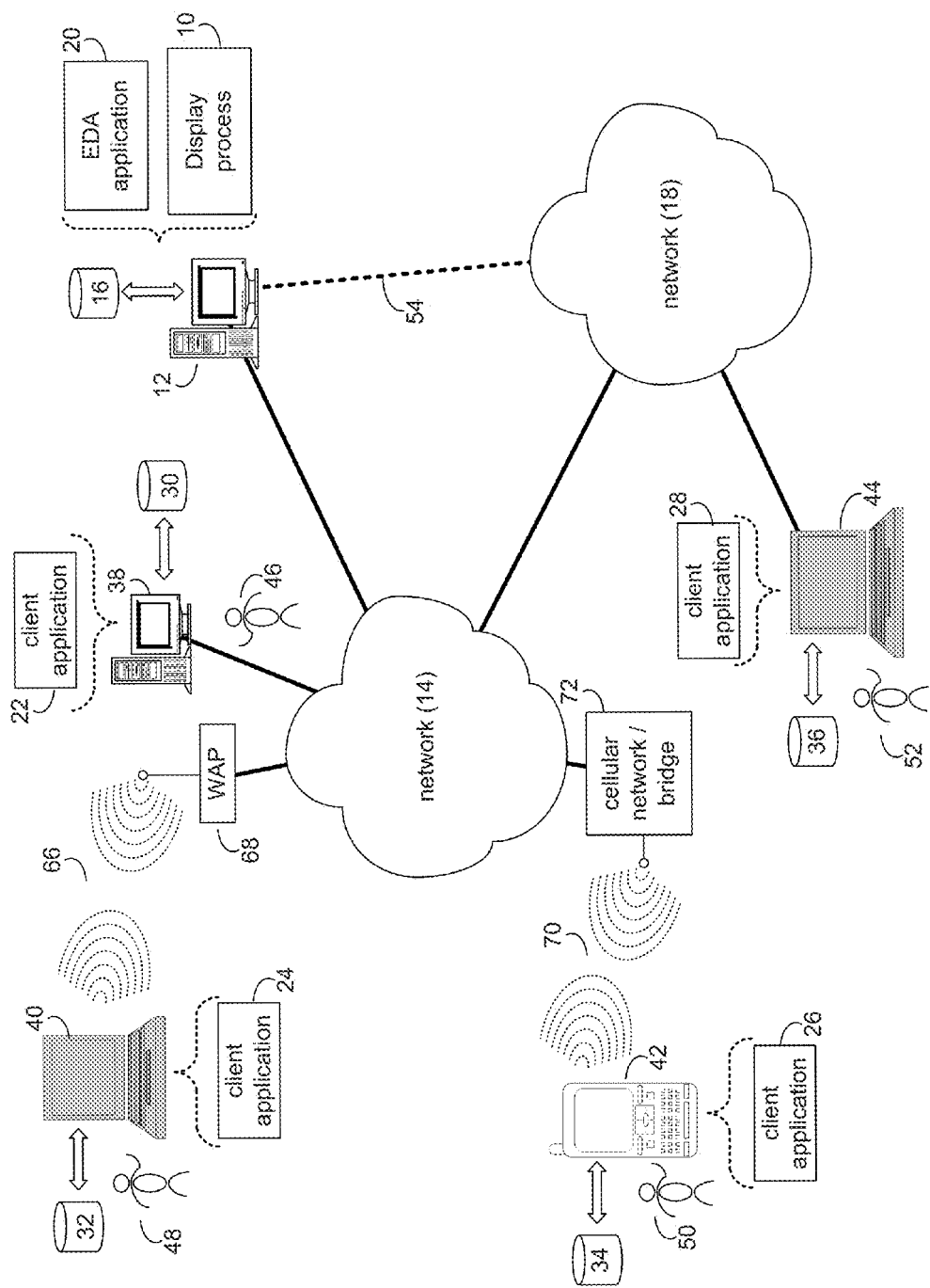
FIG. 1 is a system diagram depicting aspects of the display process in accordance with an embodiment of the present disclosure.

Referring to FIG. 1, there is shown display process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the report generation process may reside on and be executed, in whole or in part, by a client electronic device, such as a personal computer, notebook computer, personal digital assistant, or the like.

The instruction sets and subroutines of display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Display process 10 may be a stand alone application, or may be an applet/application/script that may interact with and/or be executed within EDA application 20. In addition/as an alternative to being a server-side process, the browsing process may be a client-side process (not shown) that may reside on a client electronic device (described below) and may interact with an EDA client application (e.g., one or more of EDA client applications 22, 24, 26, 28). Further, the browsing process may be a hybrid server-side/client-side process that may interact with EDA application 20 and an EDA client application (e.g., one or more of client applications 22, 24, 26, 28). As such, the browsing process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize display process 10 and display process 400.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

As is used in the art, a "Design" may refer to an Electronic Design Automation (EDA) database of information describing a Printed Circuit Board (PCB), an Integrated Circuit (IC) or an IC Package. A graphical representation of a portion of a Design is illustrated at 100 in FIGS. 2A-2B. A "Terminal" 105 may refer to a location on one or more layers of a Design to which electrical signals may be connected. For a PCB, Terminals may correspond to the pins, pads, and balls of the elements in the circuit. For an IC Package, Terminals are typically IC bumps or package balls. A Terminal may also be a junction point, such as a virtual pin or a T-junction. Multiple Terminals that are grouped together, such as depicted at 110, will be referred to as a "Component".

Figure 2A:
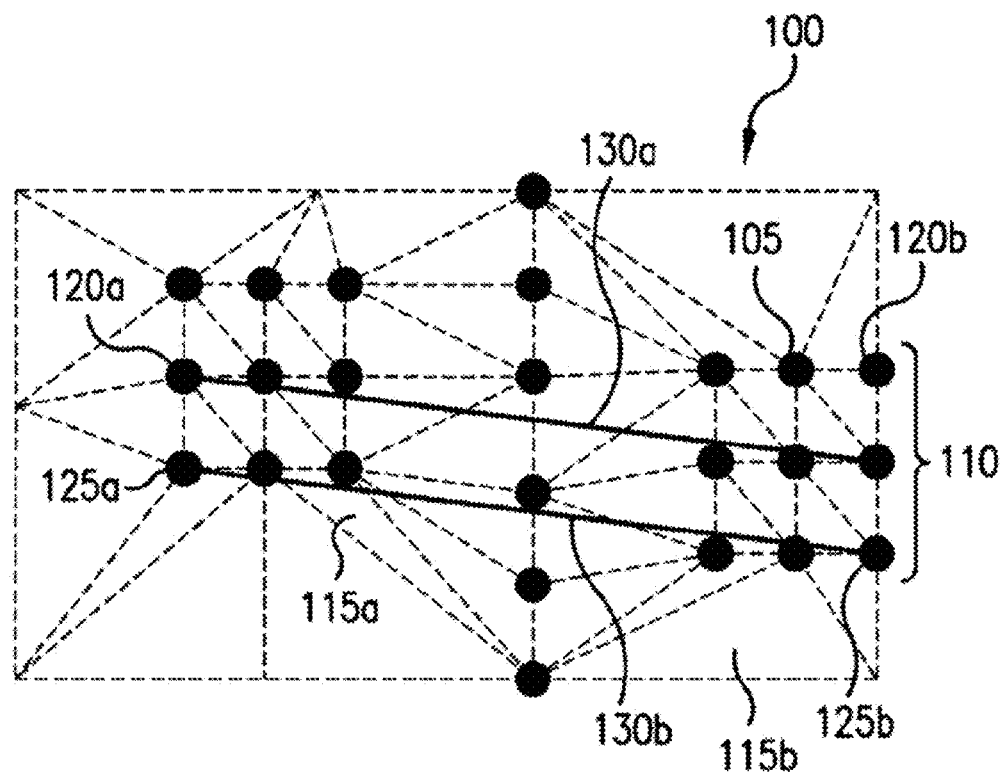
FIGS. 2A and 2B show schematics depicting aspects of the display process in accordance with an embodiment of the present disclosure.
Figure 2B:
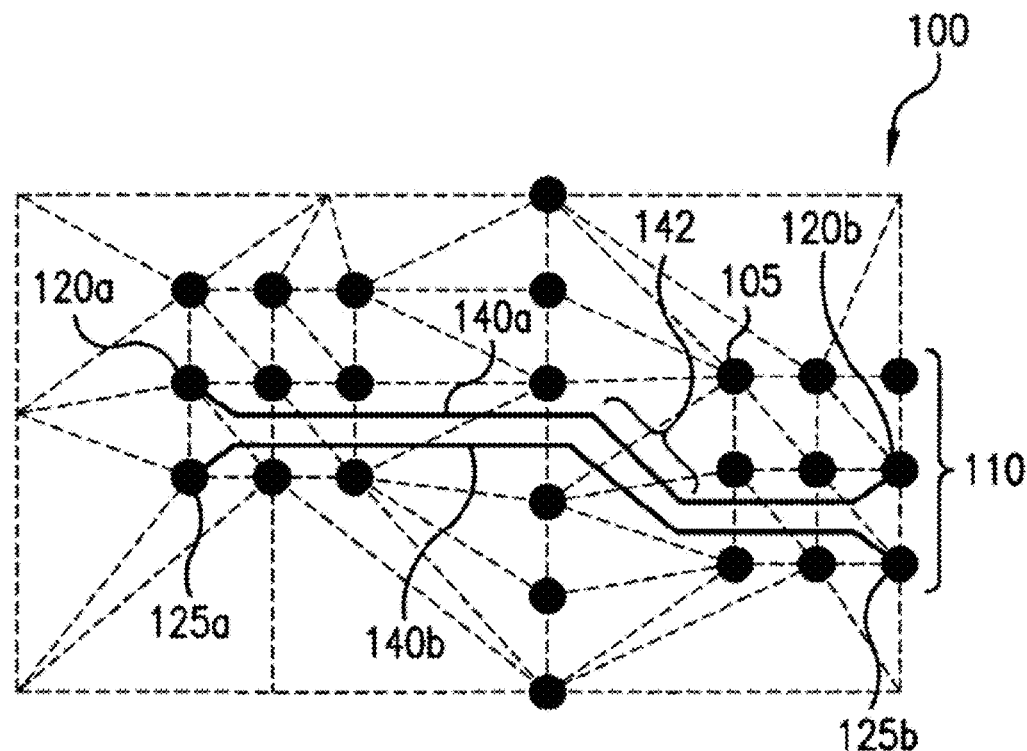

In FIGS. 2A-2B, there is shown a "Tessellation" of Design 100, i.e., the separation of the entire design space into distinct, non-overlapping regions, such as those shown at 115a and 115b. The regions in the example embodiments described herein are triangular, but it is to be understood that the regions may be formed of other polygonal shapes, such as the rectangular regions of tessellation employed in traditional autorouters.

As used herein, the term "Rat" may refer to a connection between two Terminals, i.e., a "Source Terminal" 120a, 125a and a "Target Terminal" 120b, 125b. A Rat may be unrouted, as shown at 130a, 130b of FIG. 2A, where the Rat has yet to possess geometric information defining its precise path in the Design, or a Rat can be routed as shown at 140a, 140b of FIG. 2B, where the Rat has complete geometric information specifying its ordered sequence of "Segments", an example of which is shown at 142. The Segment ordering is typically indexed or referenced starting at the Source Terminal 120a, 125a and ending at the Target Terminal 120b, 125b.

As used herein, the term "Net" may refer to a collection of Rats connecting a collection of Terminals. In some cases, the specific connections between Terminals formed by certain Rats are predetermined. In other cases, the Rats may be assembled into a Net in an order or "sequence" that is either established by the autorouter or is constrained by certain rules. For example, in the absence of any connectivity rules, the autorouter can change the collection of Rats as needed, provided the new collection still connects all of the Terminals of the Net.

Figure 3:
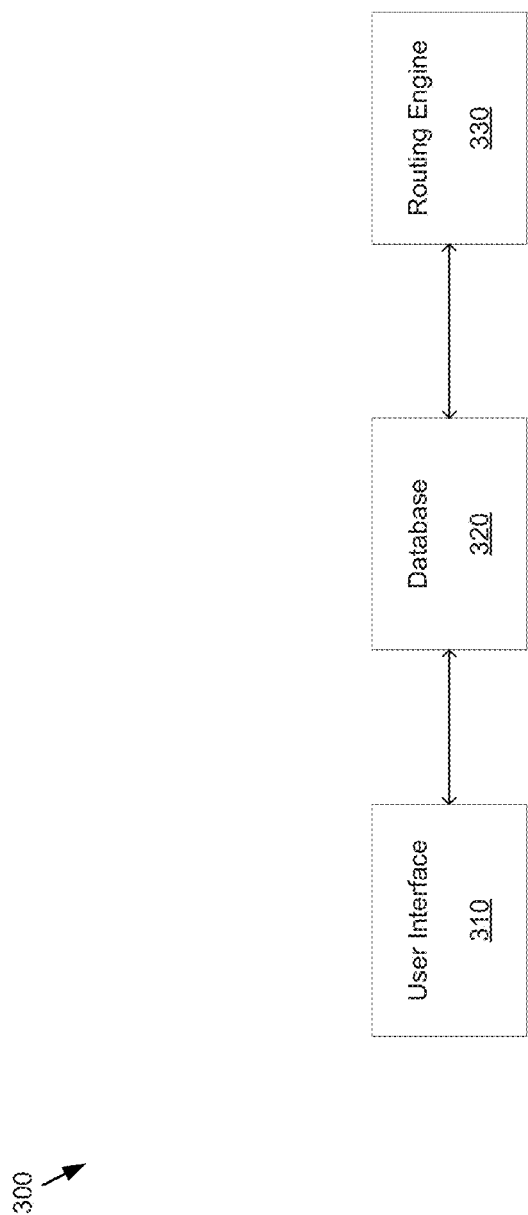
FIG. 3 is a schematic depicting aspects of the display process in accordance with an embodiment of the present disclosure.
Figure 4:
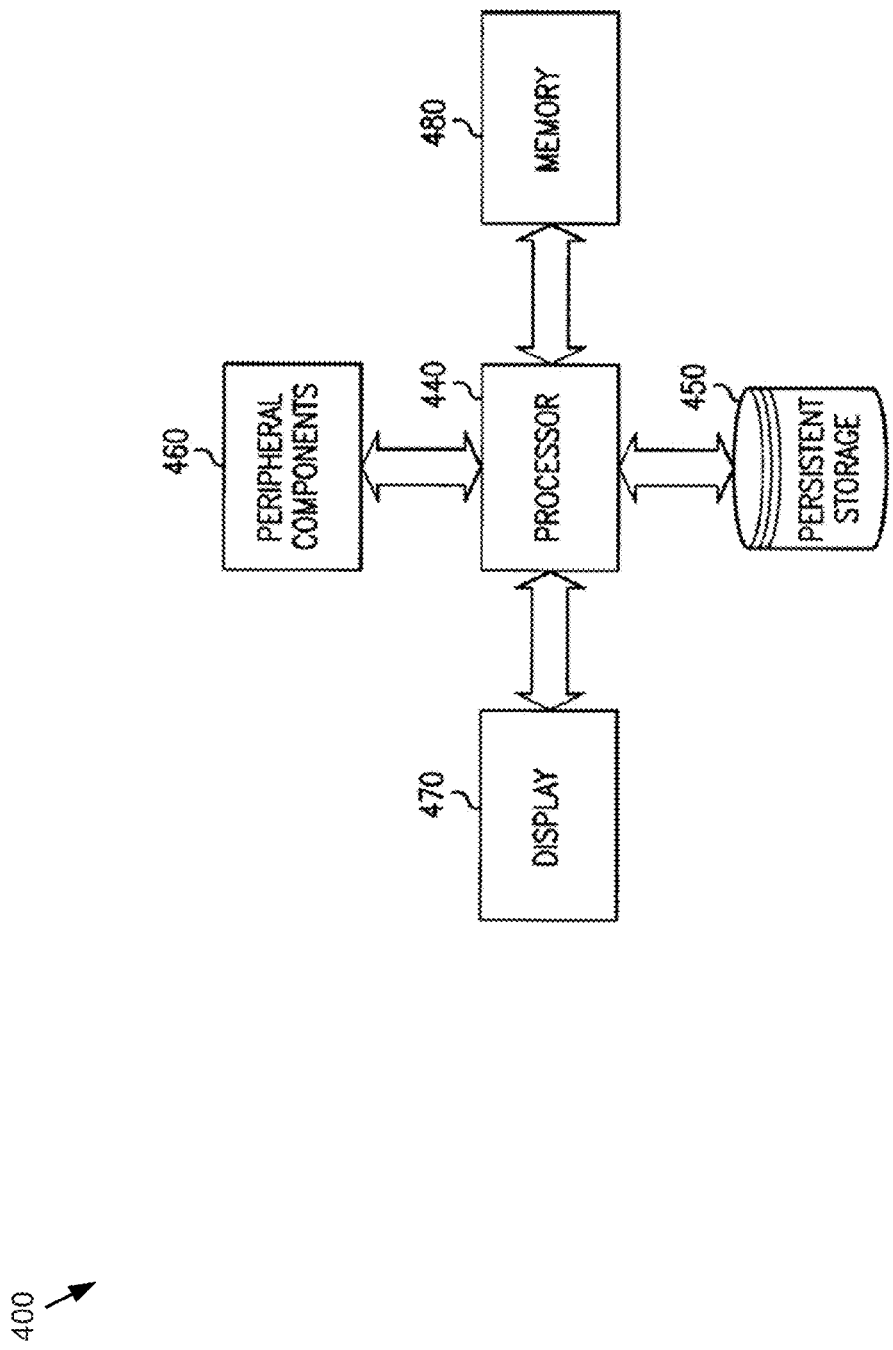
FIG. 4 is a schematic depicting aspects of the display process in accordance with an embodiment of the present disclosure.

An example embodiment depicting functional modules operable to carry out the present disclosure are illustrated in FIG. 3 and may be implemented in suitable computing hardware such as that depicted in FIG. 4. The data defining one or more Designs may be maintained in database 320 and may be presented to a user as one or more abstractions of that data through a user interface 310. A data abstraction may refer to a conceptualization of the data reduced or factored so that a user can focus on only few pertinent aspects thereof. This is useful in circuit design in that the data may be viewed in a manner appropriate to the work task at hand. For example, an IC is generally viewed by a simple block symbol during a Component placement task and is viewed as an arrangement of its Terminals in a routing task. Through these data abstractions, the user may be relieved of having to place and route the circuit in a view cluttered by the IC's constituent components, i.e., the thousands and possibly millions of transistors, resistors and other circuit elements forming the IC.

Database 320 implements a suitable structure on, for example, persistent storage system 450, for retaining data so as to be retrieved by its numerous data abstractions. Additionally, the database 320 is operable to store data that has been modified through any of its abstractions.

User interface 410 may be implemented through processor instructions stored in memory system 480 and executed by a suitable processor 440. User interface 410 may be a graphical user interface operable to display the Design on a display 470 and to allow the user to add, delete and modify features of the Design through, for example, manipulation of certain peripheral components 460 coupled to processor 440.

Routing engine 330 may execute path finding procedures to interconnect the Terminals of a Design. Routing engine 330 may be implemented through processor instructions stored in memory system 480 and executable by processor 440. The present disclosure is not limited to any specific router implementation.

Figure 5:
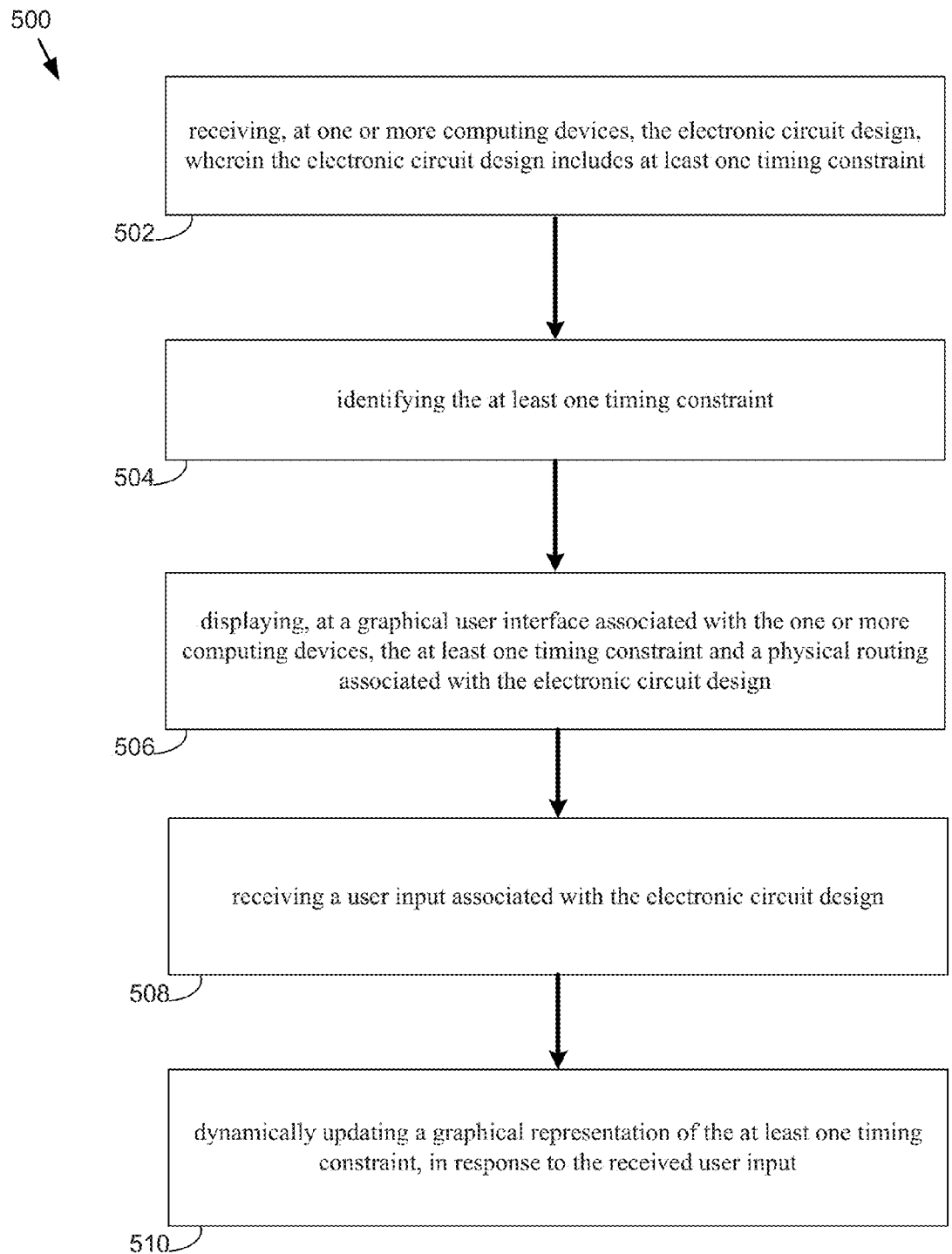
FIG. 5 is a flowchart depicting operations consistent with the display process of the present disclosure.

As shown in FIG. 5, and as will be discussed in further detail below, display process 10 may include receiving (502) the electronic circuit design, wherein the electronic circuit design includes at least one timing constraint. Display process 10 may further include identifying (504) the at least one timing constraint and displaying (506), at a graphical user interface associated with the one or more computing devices, the at least one timing constraint and a physical routing associated with the electronic circuit design. Display process 10 may also include receiving (508) a user input associated with the electronic circuit design and dynamically updating (510) a graphical representation of the at least one timing constraint, in response to the received user input.

Embodiments of display process 10 disclosed herein may be used to provide a consolidated and dynamic view of delay constraint status on a physical routing canvas. Existing systems do not provide the user with all of the necessary data on the etch-edit canvas that helps users to develop a timing solution while working on the physical routing. EDA customers need to quickly understand where the trouble spots are, where additional space is going to be needed, as well as identify the timing relationships between routed signals. Embodiments of display process 10 may provide all of this information in real-time while allowing the user to make edits in the proximity of physical routing.

Referring now to FIGS. 6-9, some examples depicting a few visualization approaches that are available to the user are provided. The first approach requires the user to open a window where the original timing/delay constraints were entered into the system. Users may then visually look at the original constraints and perform some level of cross-probing between the two windows to associate the constraint with the physical routing elements. The original constraints may be separated into several different areas based on constraint type or other signals that create timing dependencies. Users must perform their own consolidation of the constraints to find the most relevant data. The second approach provides the user with a heads-up-display ("HUD") during interactive changes on the routing canvas. This often involves one or more additional dynamic windows that give some color coding and numerical data that relates the current physical change to the timing/delay constraint that affects that element (e.g., cline, via, segment . . . etc). The third approach provides timing/delay related information as the user makes specific queries from the physical routing canvas. As an example, the user could query a specific routing line or net and obtain information for all delay constraints on that entity.

Figure 6:
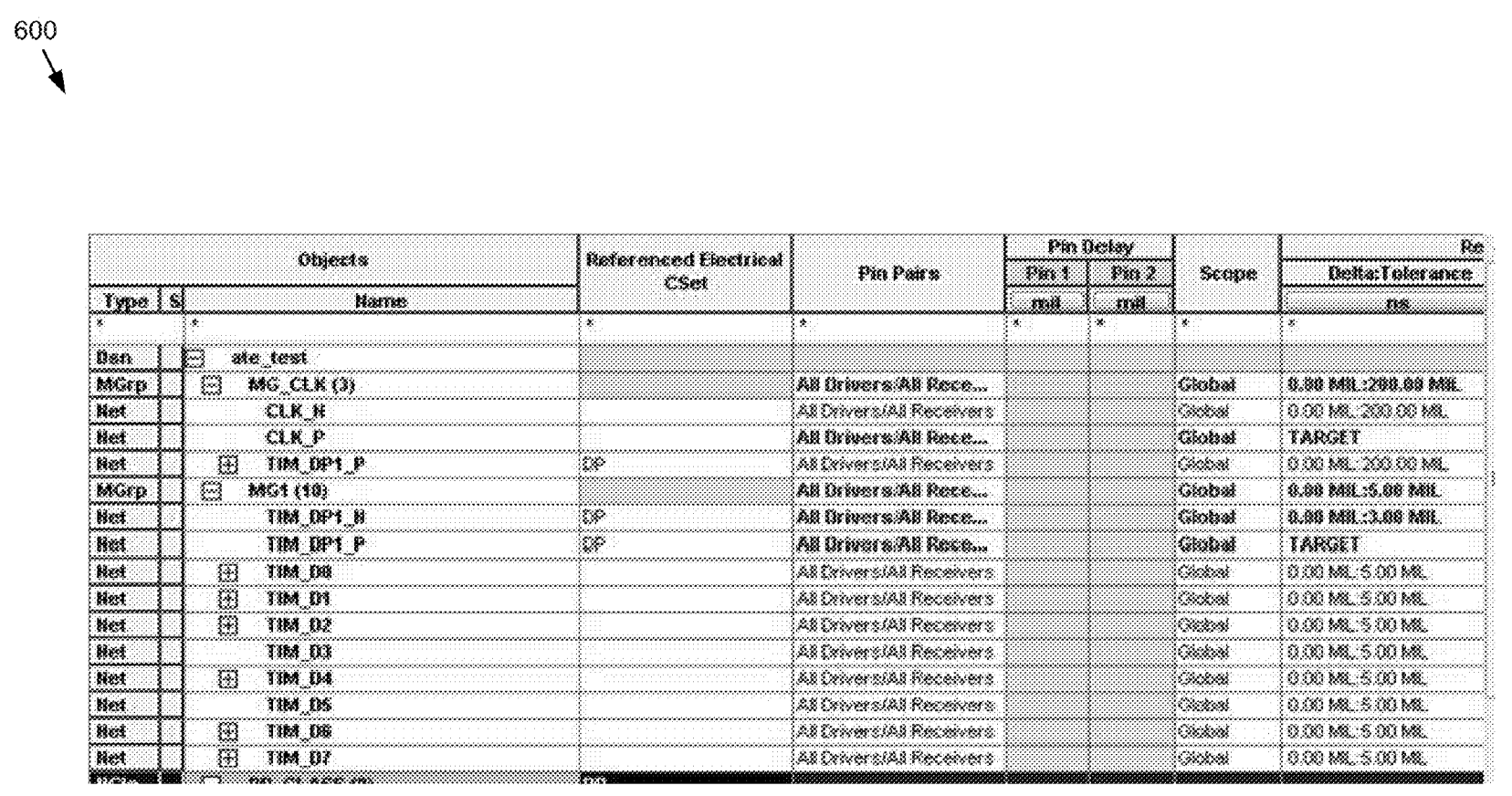
Figure 7:
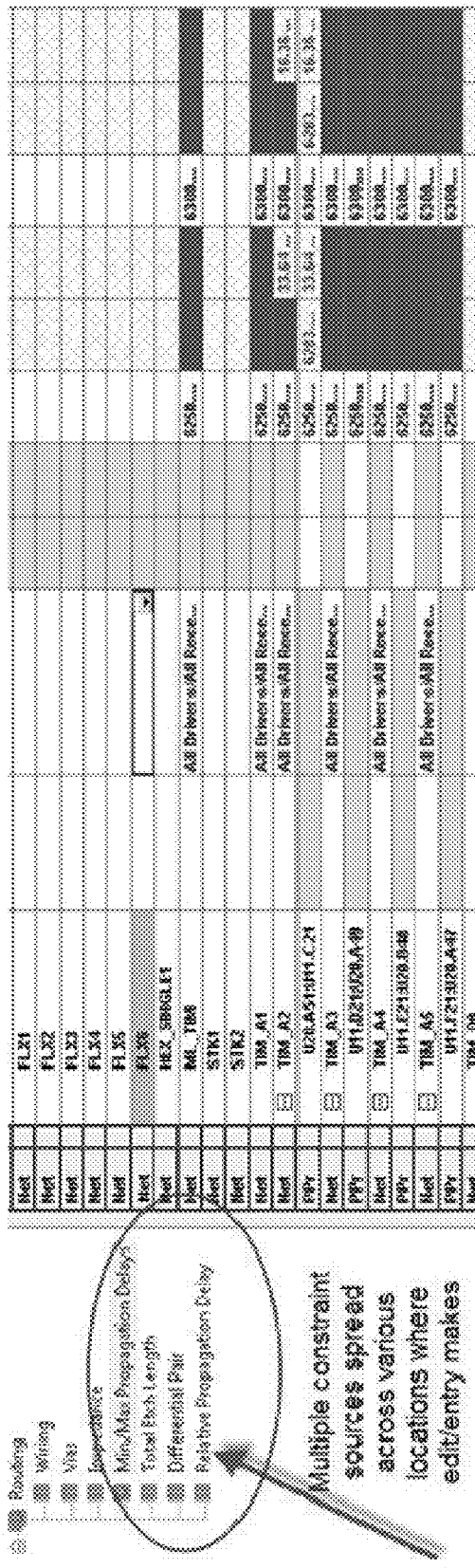
FIG. 7 is a schematic depicting aspects of the display process in accordance with an embodiment of the present disclosure.

The first approach, as depicted in FIGS. 6-7, may allow a user to launch a second window (other than the current physical routing canvas) to view/query on the source of the timing constraints. However, this extra window requires additional screen space, or the use of a second monitor to visually see it without taking space from the physical routing canvas. Further, the original source of the timing constraints may show all places that constraints are entered or exist for a specific net; however the user needs to understand the information in a consolidated format as they make routing changes. FIG. 7 shows an example depicting multiple sources of timing constraints. In this approach, the user must understand any interdependencies between physical routing entities as they make changes. As an example, increasing the length on one net can change the status of another net and require additional changes. It is difficult to see many of the dependencies from a view of the original constraints. This approach generally causes system performance to degrade while making edits on the routing canvas. This is because of the status updates being made into another window for all visible sources of constraints related to the signal being modified.

Figure 8:
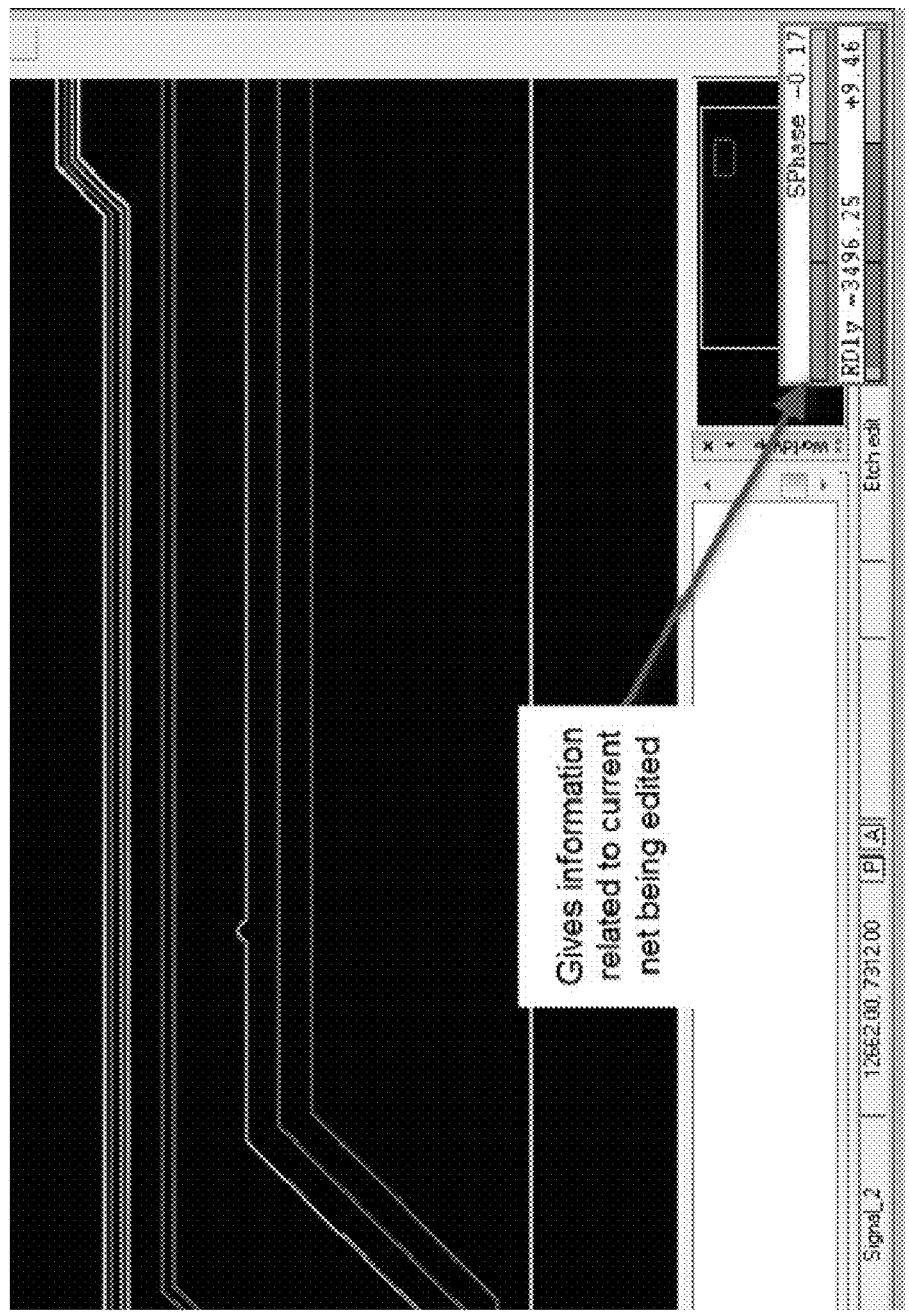
FIG. 8 is a schematic depicting aspects of the display process in accordance with an embodiment of the present disclosure.

The second approach, as depicted in FIG. 8, shows an example of a heads-up-display giving timing constraint data during an edit. This approach may be effective while making a change on the physical routing canvas, but it provides no benefits when the user is not in the middle of an edit. This approach is also limited because it does not help the user understand how the current change affects multiple other signals. Some numerical data can be used to give a general insight to creating a problem, but this does not help the user understand the scope or scale of the problem (e.g. how many signals are being impacted, to what degree they are impacted, where those signals are physically located).

Figure 9:
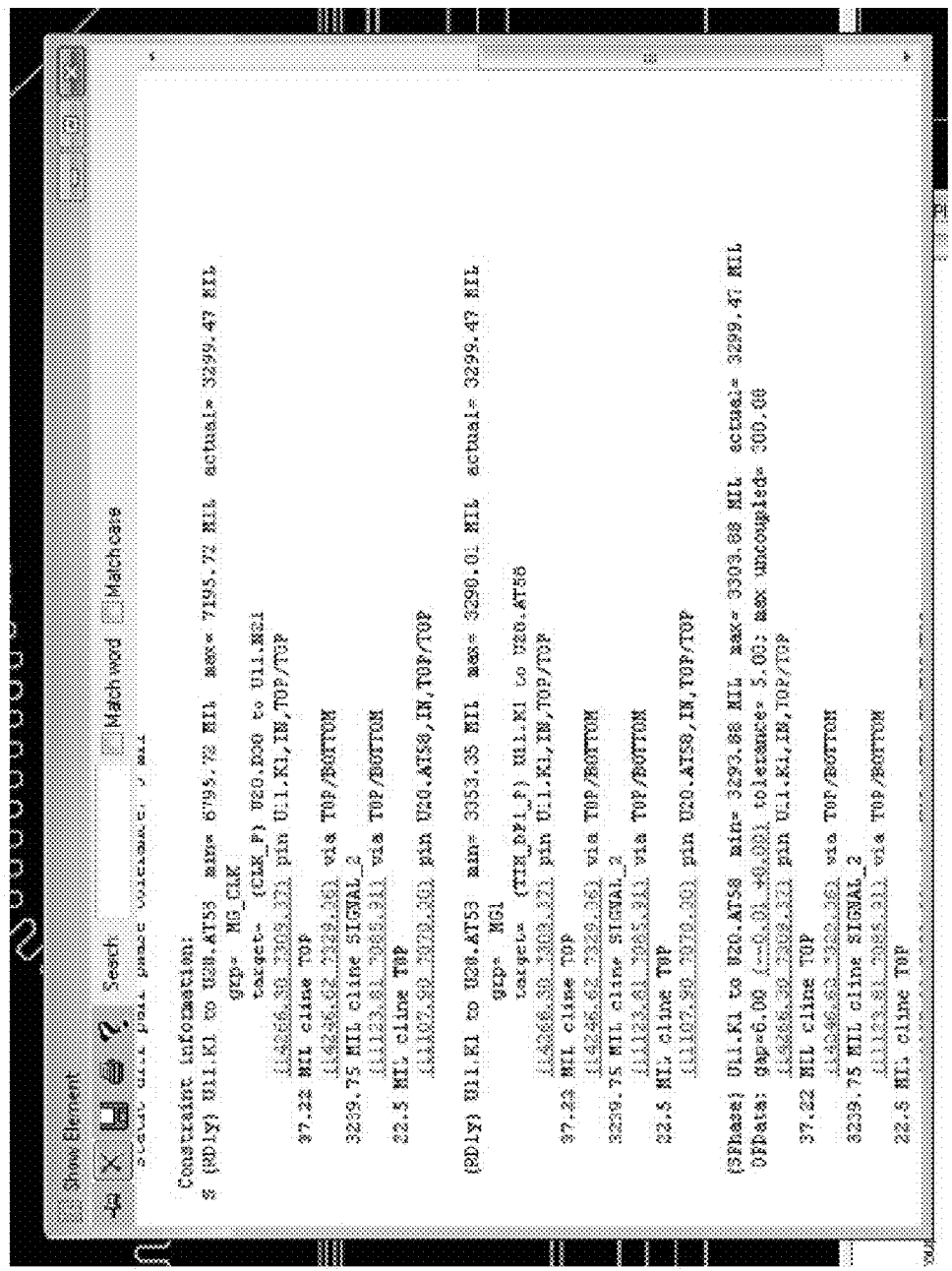
FIG. 9 is a schematic depicting aspects of the display process in accordance with an embodiment of the present disclosure.

The third approach, as depicted in FIG. 9, shows an example providing data from direct user queries on the routing canvas. This approach can provide very detailed information on a specific query made the by the user, however it becomes static once the query is made and lacks the ability to effectively show relational information across multiple nets/entities. The query result data also has the drawback of being disassociated from the routing canvas.

These approaches do not consolidate the timing constraints information to help the user quickly converge on a timing solution. Since the necessary information is not available directly on the routing canvas, the user must shift their focus to another area or window during their edits. There is no visible indication to show how changes to one signal may positively or negatively affect many other routing signals in the design.

Accordingly, embodiments of display process 10 described herein may be configured to consolidate all timing/delay constraints status onto the physical routing. Additionally and/or alternatively, the graphical user interface associated with display process 10 may not require any additional screen space from the user (e.g. user 46 shown in FIG. 1, etc.). Moreover, display process 10 may allow for dynamic graphical status updates on each net/signal being edited as well as providing dynamic graphical status updates on all visible timing related/dependent nets/signals. In this way, display process 10 may allow the user to maintain his/her focus upon the canvas where high-level (e.g. coloring) and detailed (e.g. data tips) timing information may be made available In some embodiments, display process 10 may allow the user to select which signals display timing mode graphics versus standard routing graphics. Display process 10 may also be configured to identify critical signals on the canvas to influence edit decisions and understand timing relationships (e.g. matchgroup targets, etc.). In some embodiments, display process 10 may allow a user to identify differential phase status in a separate manner from timing/delay. Additionally and/or alternatively, display process 10 may allow the user to make large-scale routing changes and understand timing implications in a more effective way. In some embodiments, a color spectrum may be used to show levels of constraint compliance thus providing more detail. Embodiments of display process 10 may provide detailed timing information, which may be available from the canvas without requiring user queries. Accordingly, display process 10 may greatly simplify the process of resolving timing constraints for all levels of users.

Embodiments of display process 10 may provide the user with all necessary timing/delay DRC information directly on the canvas. As discussed herein, the information may be dynamic in nature and may update in real-time as the user makes edits and/or changes. User options may allow for customization of graphics using colors and/or patterns to indicate relevant data. Display process 10 may allow the user to visualize the status for multiple signals at once on the routing canvas. Therefore, the user may plan multi-step edits rather than focusing on adjusting a single route/signal at a time. The consolidation of all constraints onto the objects also diminishes effort and time for the user to find and map the original constraints. The user is allowed to maintain their focus on the routing canvas and still be able to understand the current timing constraint status and the effects of their edits. Display process 10 may simplify the operations required to solve timing issues in order to achieve positive results (e.g. 'good' status coloring) while making edits on the routing.

Embodiments of display process 10 may transform a user's view of the physical routing into a timing intelligent canvas. Understanding the current state of the timing/delay requirements visually conveyed within the physical routing may allow the user to develop a strategy for solving the physical timing requirements on a much larger scale.

Figure 10:
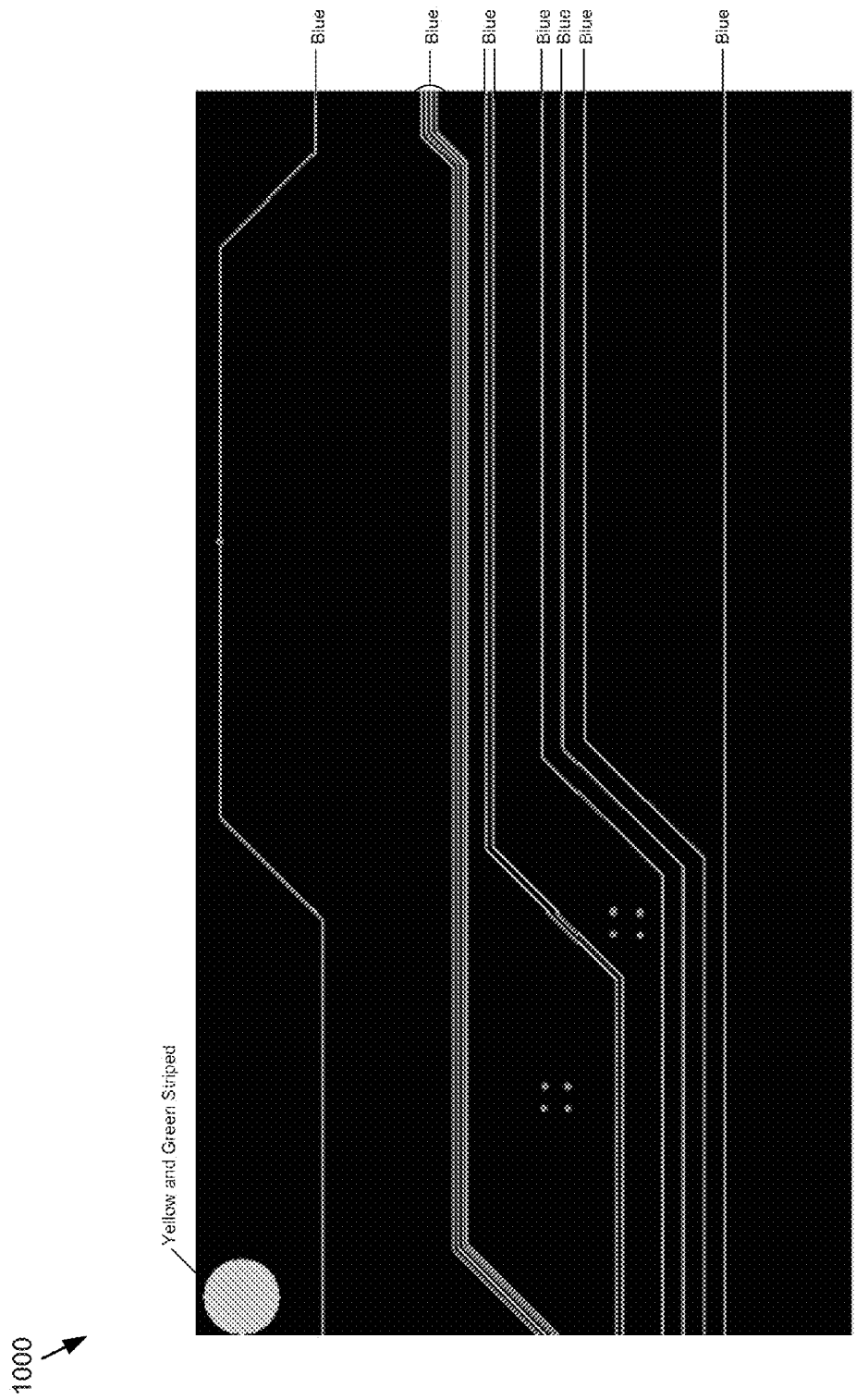
FIG. 10 is a schematic depicting aspects of the display process in accordance with an embodiment of the present disclosure.
Figure 11:
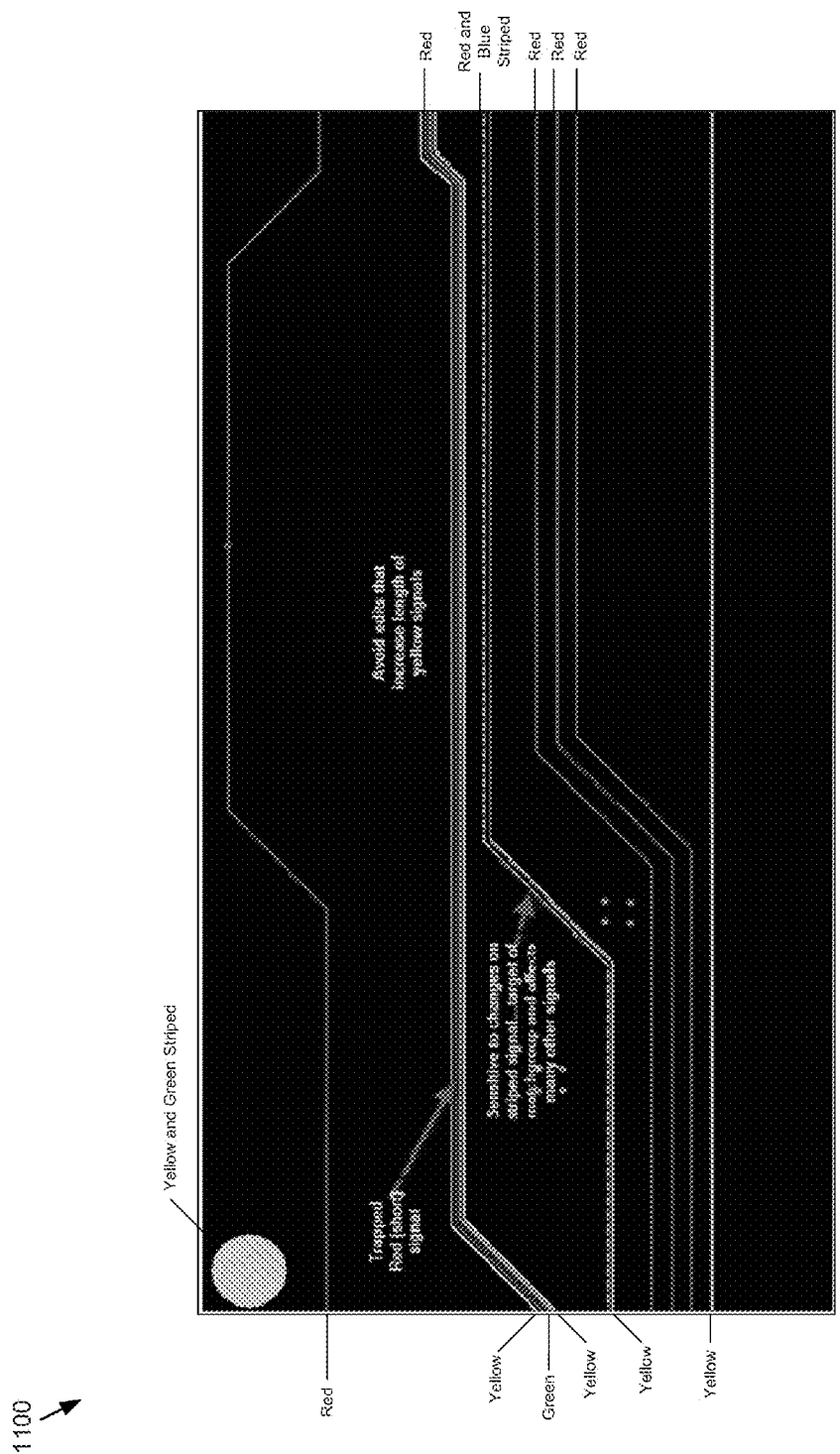
FIG. 11 is a schematic depicting aspects of the display process in accordance with an embodiment of the present disclosure.

Referring now to FIG. 10, an embodiment showing an example of how a user would look at part of a routed bus is provided. Standard routing modes and etch coloring gives no indication of timing issues or relationships. FIG. 11 shows a three color spectrum applied to the physical routing which shows signals that do not meet timing constraints. For example, in this particular example, signals that are red in color are too short, signals that are green in color are good, and signals that are yellow in color are too long. The user can now make a better plan to open space for the trapped red signal, without adding length to the yellow signals, or changing overall length of the green signal. For example, in this particular case, any changes that shorten the yellow signals may be an improvement. The user can now make intelligent initial edits rather than combinations of edits that may work against the overall solution for the bus.

Figure 12:
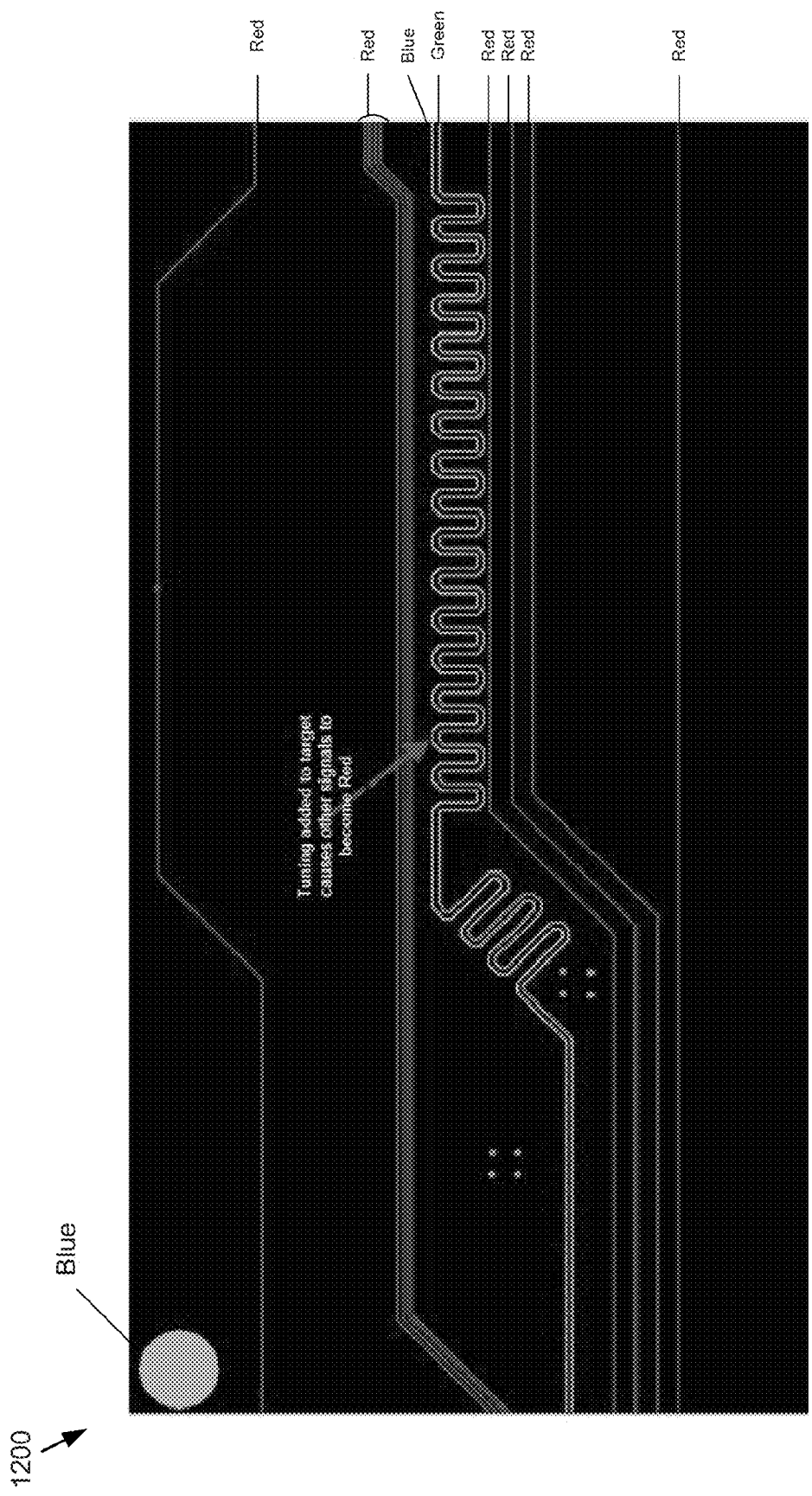
FIG. 12 is a schematic depicting aspects of the display process in accordance with an embodiment of the present disclosure.

Referring now to FIG. 12, an embodiment depicting some of the dynamic features of display process 10 is depicted. This particular example shows elongation as first added to the target signal of the matchgroup and how that affects the other signals. In this case, adding enough length to make the target signal green, causes all other signals to become red. Editing all target signals first is a common and effective first step when possible. Accordingly, display process 10 may make it easier to find the target signals and understand the impact of changing those signals, along with helping to visualize a strategy to open space on the routing to meet the timing requirements. Once the target signal is green, a user may want to avoid making edits that change the length of the target signal and cause other signal color changes. This indicates possible rework for the user.

Figure 13:
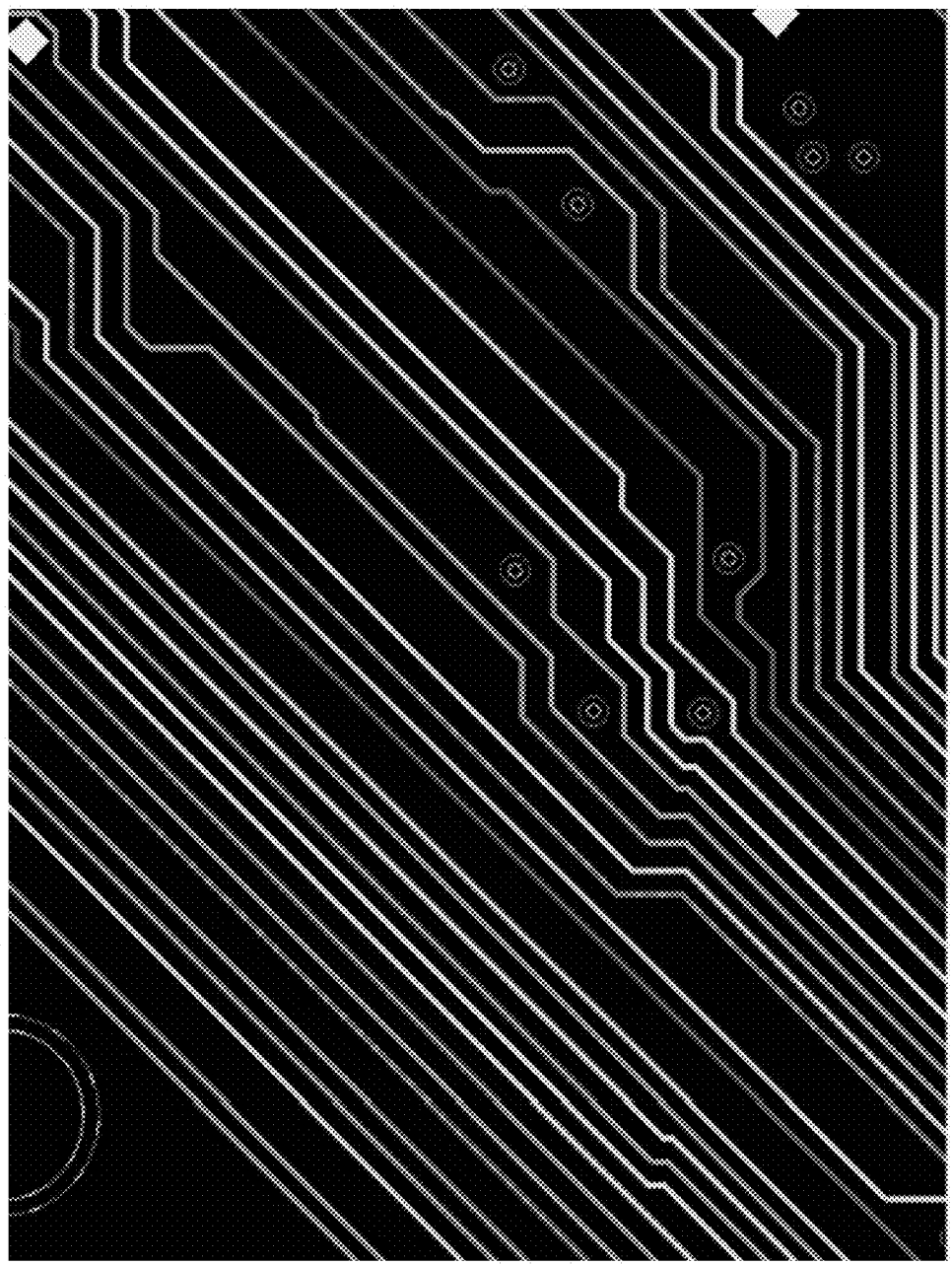
FIG. 13 is a schematic depicting aspects of the display process in accordance with an embodiment of the present disclosure.
Figure 13:

In some cases, it may be more helpful to use a broader color spectrum for further classification of the timing/DRC status. FIG. 13 depicts an embodiment using a five color spectrum. Here, Red=very short; Pink=small amount short; Green=Good; Orange=small amount long; Yellow=very long. It should be noted that the teachings of the present disclosure may be extended to varying levels of classification and coloring. The different color coding may indicate more critical timing situations to solve first or how much space may be needed to be reserved for later tuning.

Figure 14:
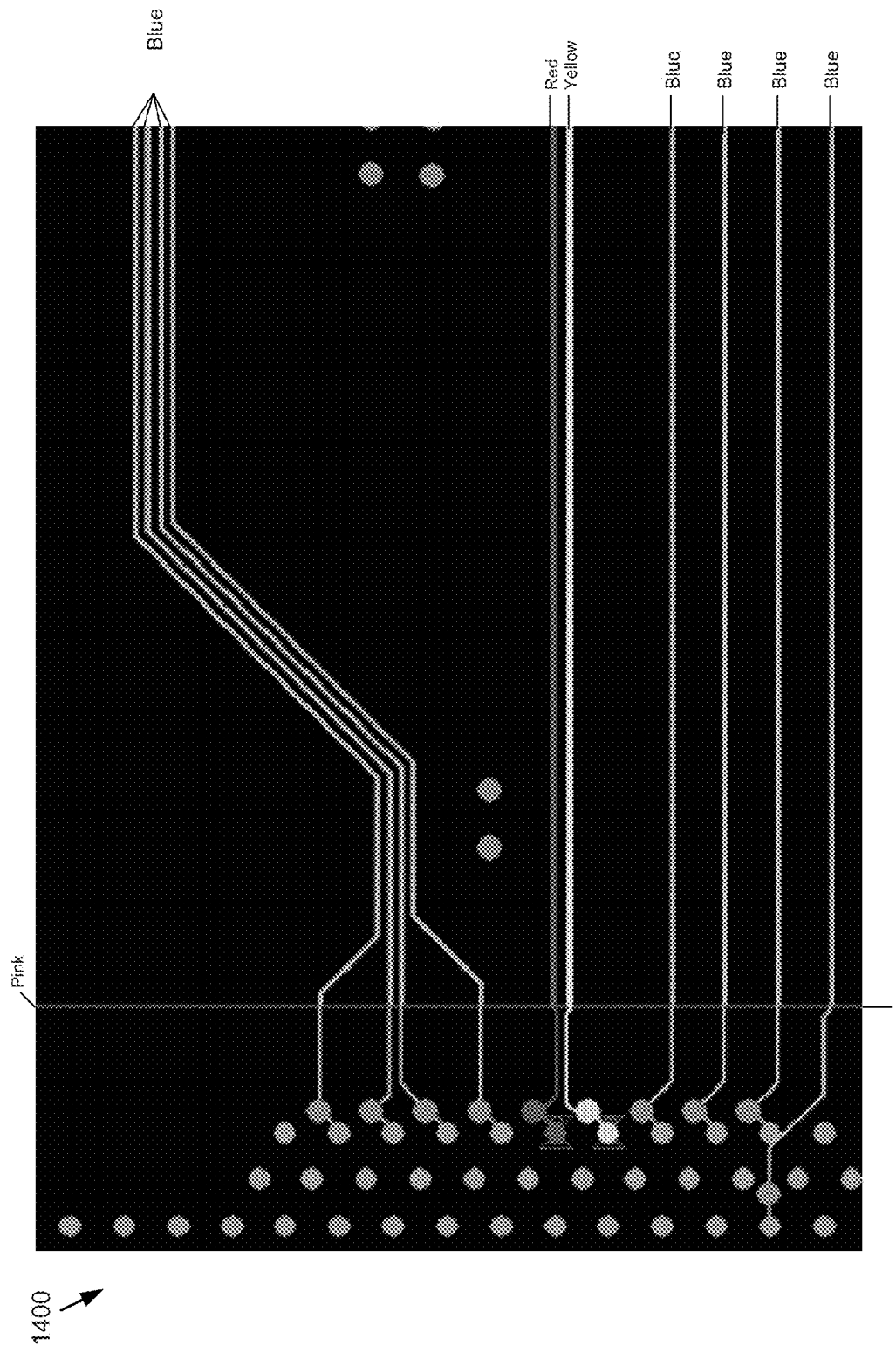
FIG. 14 is a schematic depicting aspects of the display process in accordance with an embodiment of the present disclosure.

In some embodiments, display process 10 may show differential phase timing status which may be localized to each differential pair. Generally, users may want to solve any phase problems before attacking the larger timing problem. The same short/long color coding may be used to simplify the use model. FIG. 14 shows a differential pair colored to stand out from the other signals and identifies which mate signals should be lengthened/shortened.

Figure 15:
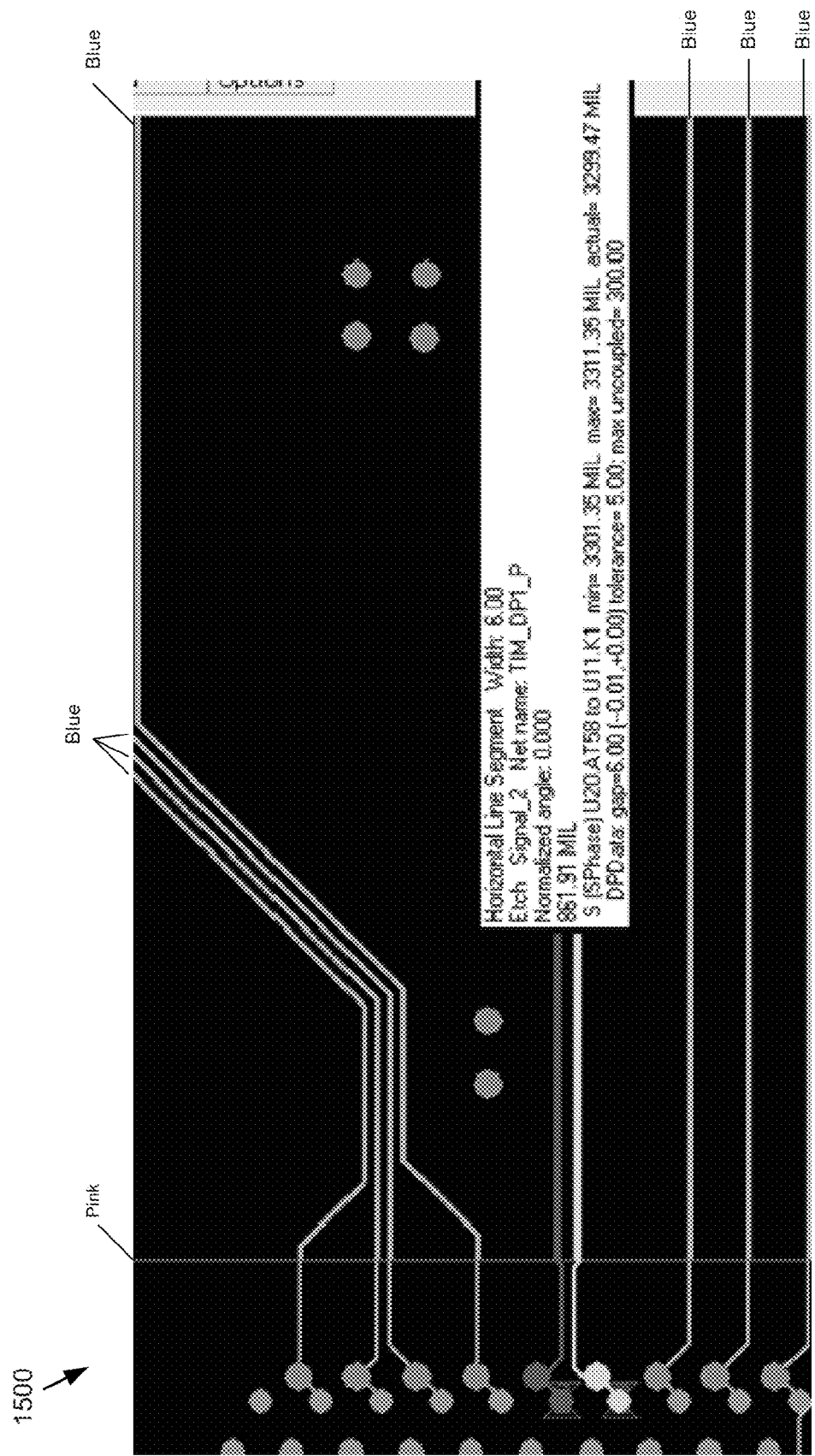
FIG. 15 is a schematic depicting aspects of the display process in accordance with an embodiment of the present disclosure.

In some embodiments, display process may make available detailed information directly in the canvas using hover over tips that keeps the user focused on the routing area. FIG. 15 shows an example of detailed information for static phase displayed if the user pauses the cursor or hovers on differential pair nets selected for the dynamic phase mode.

Referring now to FIGS. 16-21, embodiments depicting aspects of display process 10 in operation are shown. Here, graphical information may be provided to the user for developing better strategies during etch editing to solve the timing problem. The dynamic feedback indicates good or bad effects from changes made and delivers real-time DRC status to understand progress and timing relationships.

Figure 16:
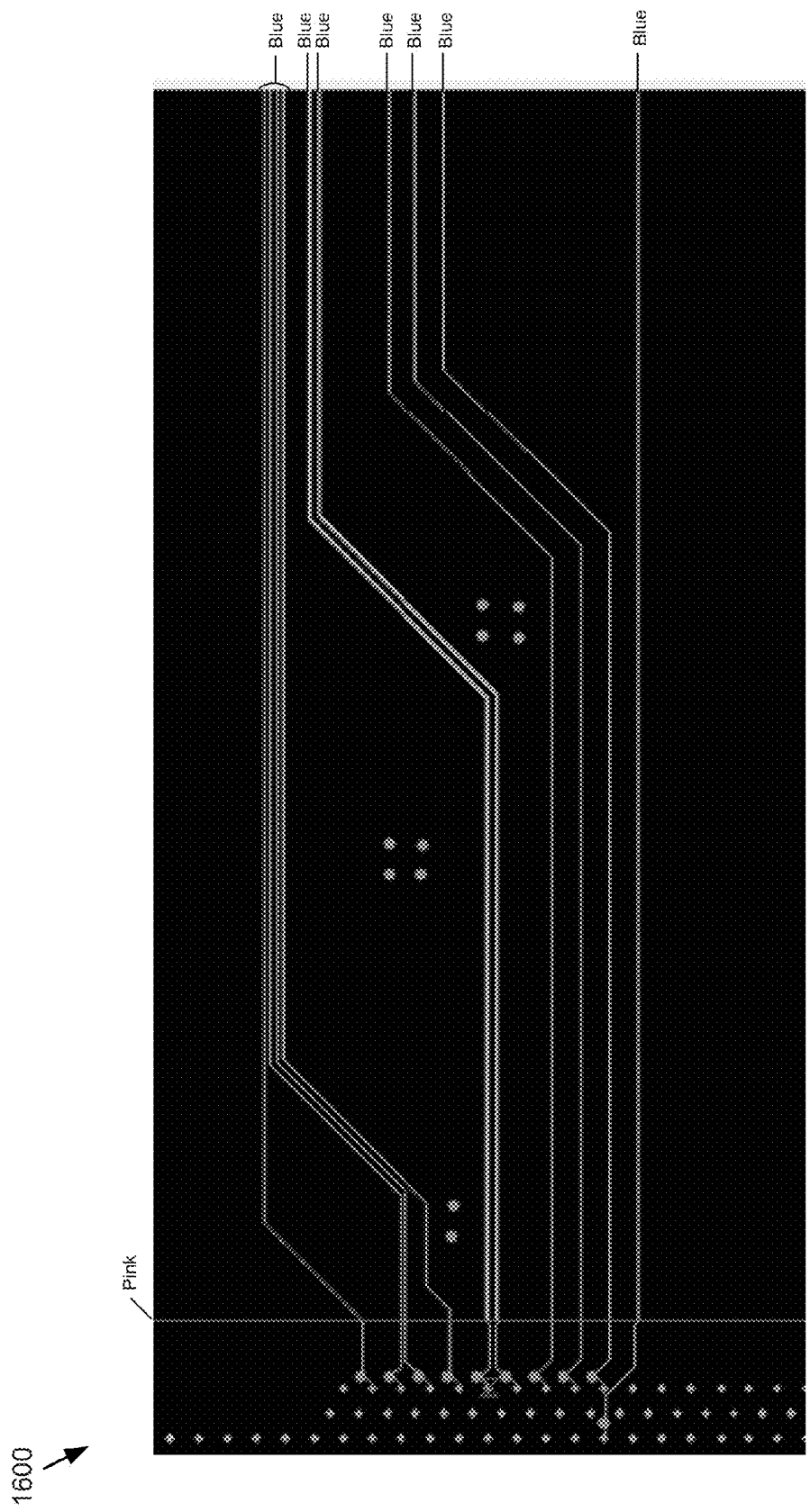
FIG. 16 is a schematic depicting aspects of the display process in accordance with an embodiment of the present disclosure.

FIG. 16 shows a typical routing canvas view. All related routing on a single layer uses a single color. No indication of timing status or errors on routing.

Figure 17:
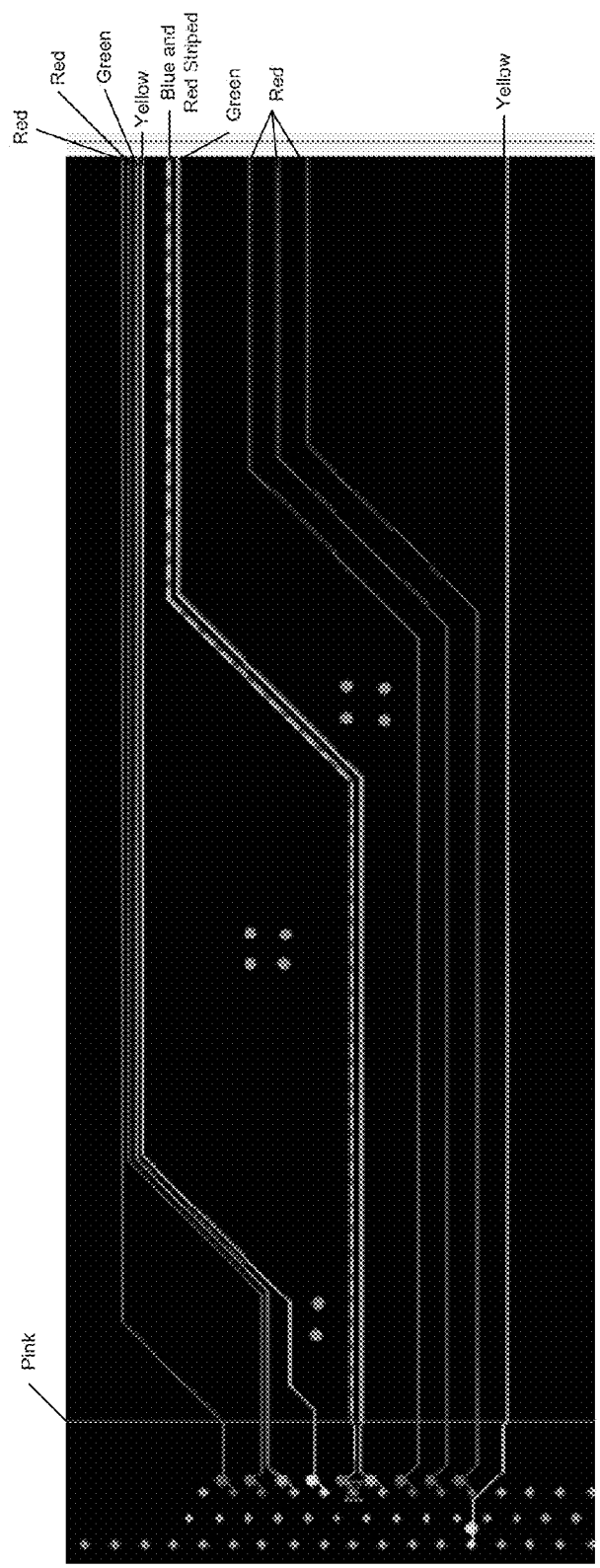
FIG. 17 is a schematic depicting aspects of the display process in accordance with an embodiment of the present disclosure.

FIG. 17 shows timing status based on coloring. Striped pattern indicates critical target signal. The status color coding and critical signal identification may be achieved as described herein (e.g. using different colors, line types, etc.).

Figure 18:
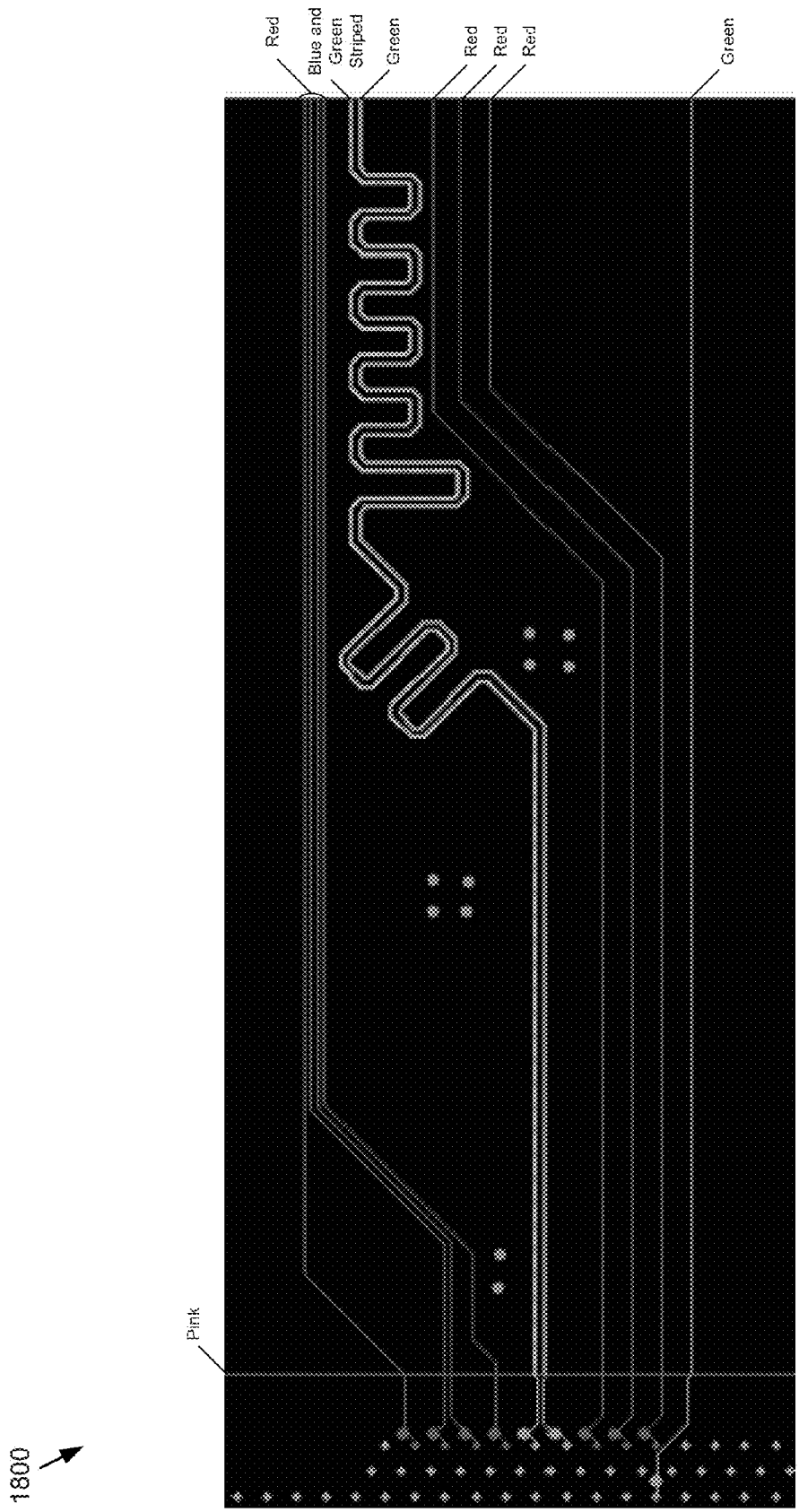
FIG. 18 is a schematic depicting aspects of the display process in accordance with an embodiment of the present disclosure.

In FIG. 18, a user may make adjustments on a critical signal first, until its color dynamically updates (e.g. to Green) and may continue making adjustments on this critical signal until all related signals have changed indicators (e.g., Red or Green).

Figure 19:
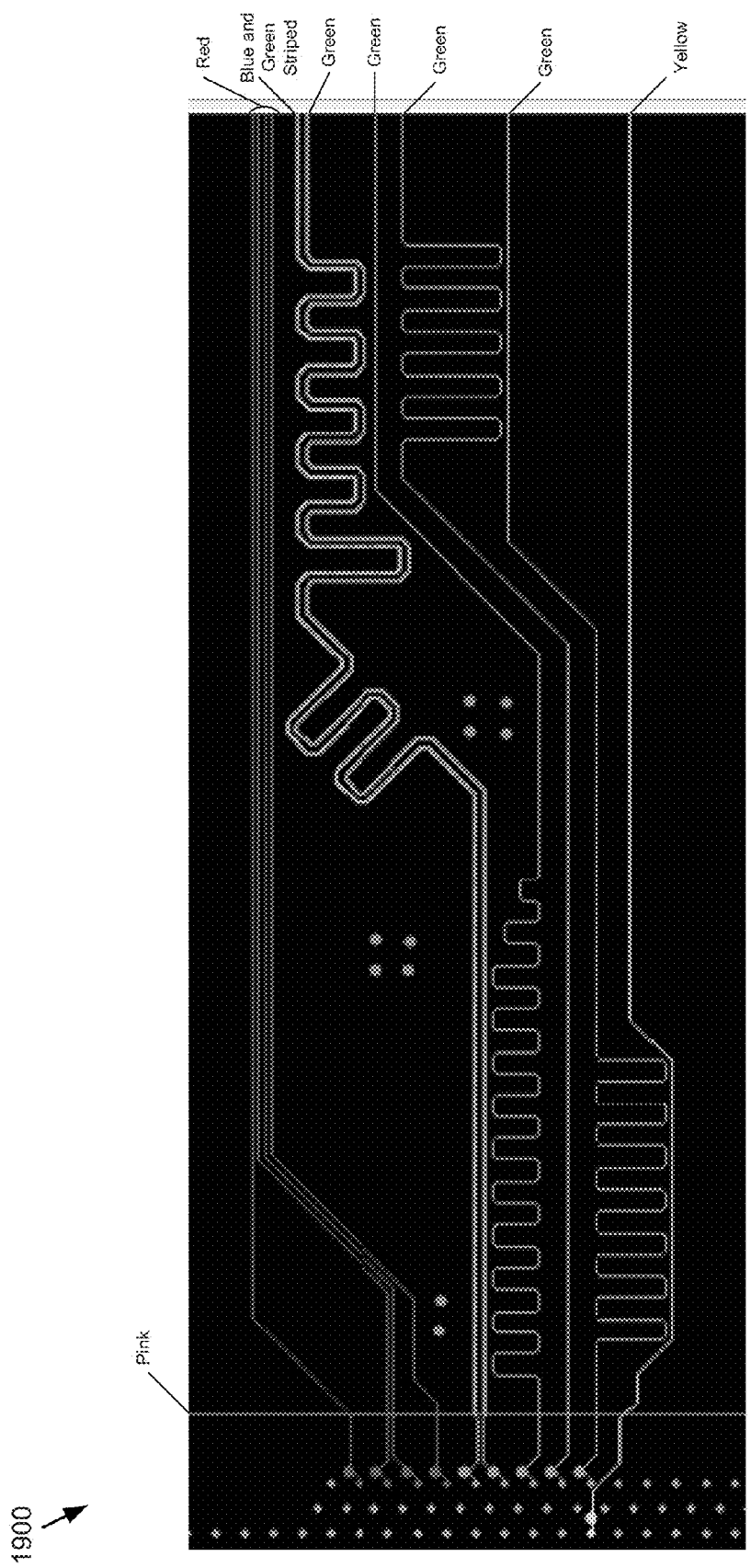
FIG. 19 is a schematic depicting aspects of the display process in accordance with an embodiment of the present disclosure.

In FIG. 19, a user may edit the lower three Red signals until they dynamically become Green. However, changes made may cause the lowest signal to go from Green to Yellow, which now indicates an error condition.

Figure 20:
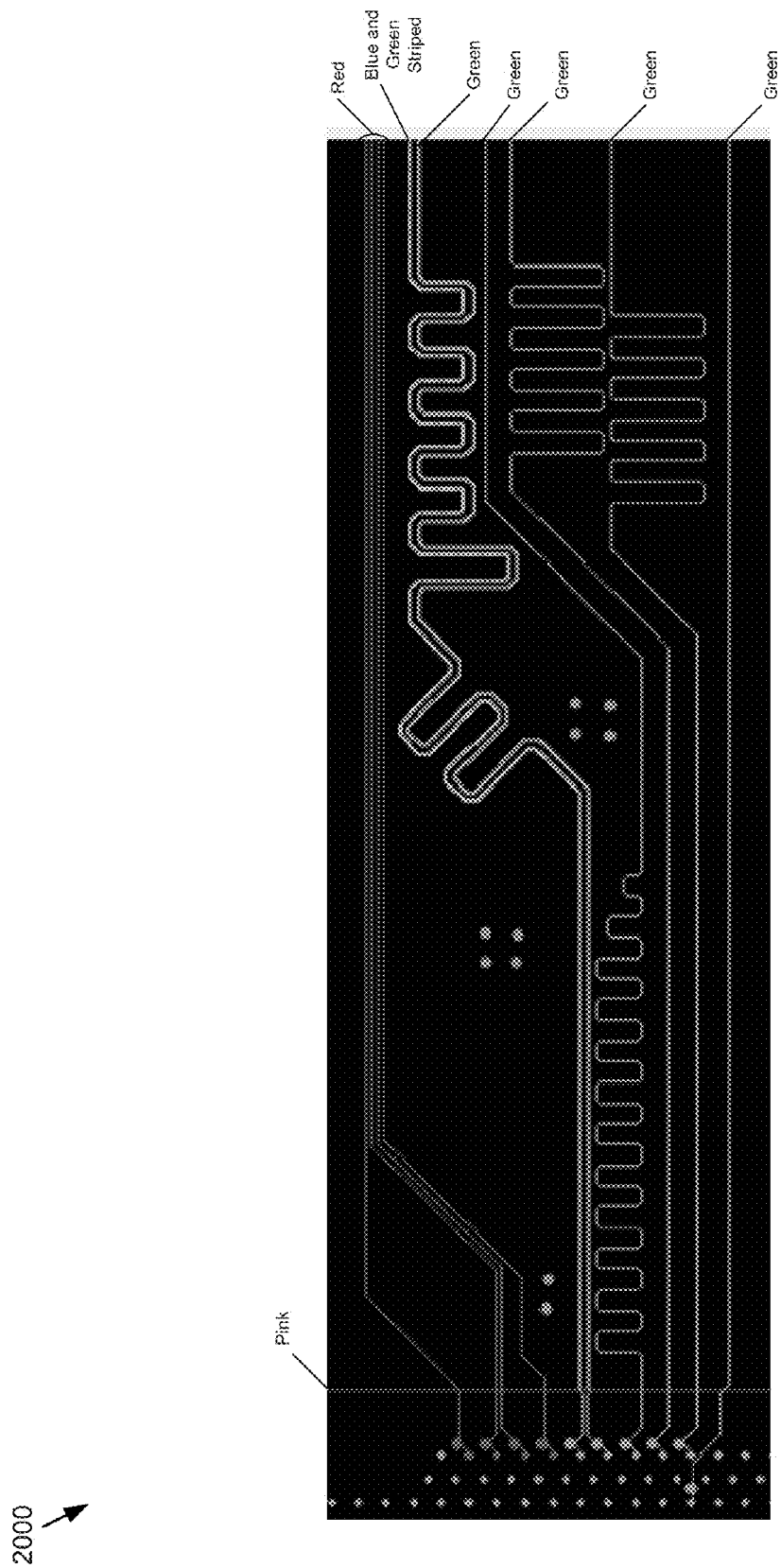
FIG. 20 is a schematic depicting aspects of the display process in accordance with an embodiment of the present disclosure.

In FIG. 20, a user may make an alternative edit choice based on dynamic feedback that now leaves all lower signals Green and error free.

Figure 21:
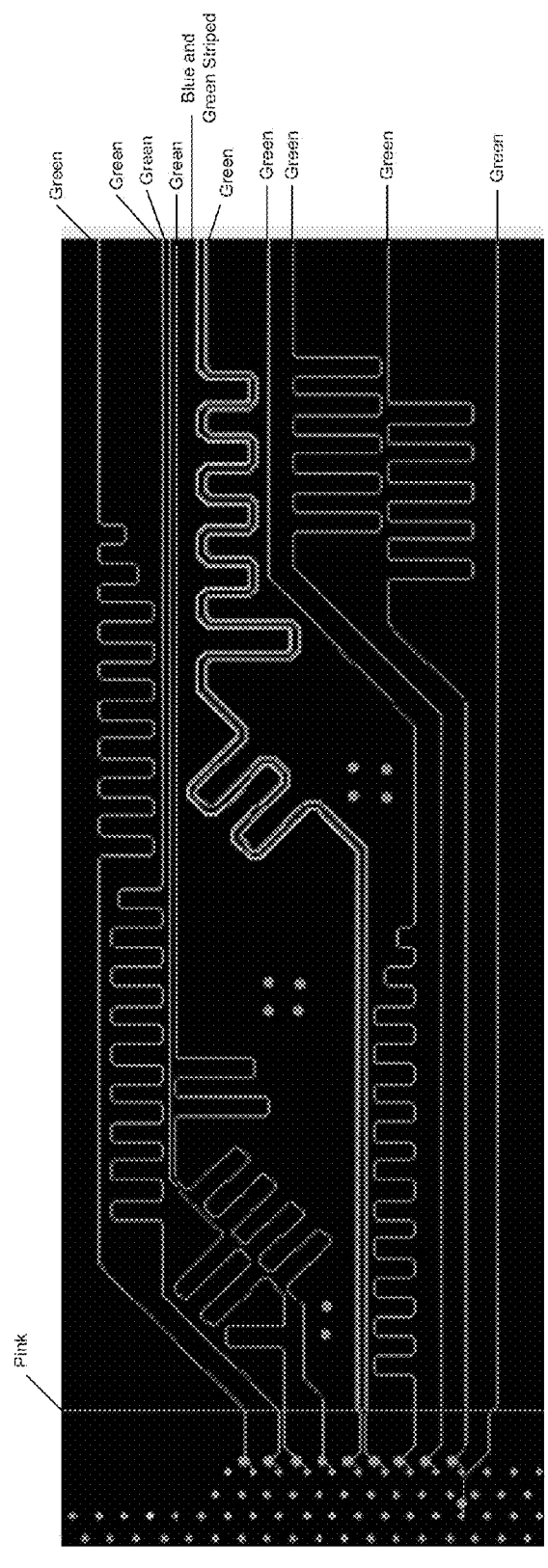
FIG. 21 is a schematic depicting aspects of the display process in accordance with an embodiment of the present disclosure.

In FIG. 21, a user may make edits to the upper Red signals until dynamic coloring is Green. This may ensure that dynamic coloring on the other signals does not become Red or Yellow based on changes made.

In some embodiments, EDA application 20 may be configured to perform testbench automation, reuse, and analysis to verify designs from the system level, through RTL, to the gate level. EDA application 20 may support a metric-driven approach and may utilize a native-compiled architecture in order to speed the simultaneous simulation of transaction-level, behavioral, low-power, RTL, and gate-level models.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 may be configured to fuel testbench automation, analysis, and reuse for increased productivity. EDA application 20 may be configured to ensure verification quality by tracking industry-standard coverage metrics, including functional, transactional, low-power, and HDL code, plus automatic data and assertion checking EDA application 20 may be configured to drive and/or guide verification with an automatically backannotated and executable verification plan. EDA application 20 may be configured to create reusable sequences and multichannel virtual sequences on top of a multi-language verification environment and to configure existing Universal Verification Components (UVCs) or quickly constructs all-new UVCs. EDA application 20 may be configured to enable advanced debug for transaction-level models, SystemVerilog/e class libraries, transient mixed-signal, low-power, and traditional waveform analysis.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for visualizing an electronic circuit design comprising:
   receiving, at one or more computing devices, the electronic circuit design, wherein the electronic circuit design includes at least one timing constraint;
   identifying the at least one timing constraint;
   displaying, at a graphical user interface associated with the one or more computing devices, the at least one timing constraint and a physical routing associated with the electronic circuit design;
   receiving a user input associated with the electronic circuit design;
   dynamically updating a graphical representation of the at least one timing constraint, in response to the received user input wherein the displaying and the dynamic updating of the graphical representation is performed on a routing canvas in a window of the graphical user interface.

2. The computer-implemented method of claim 1, wherein the at least one timing constraint includes all of the timing constraints for a visualized portion of the electronic circuit design.

3. The computer-implemented method of claim 1, further comprising:
   in response to dynamically updating the graphical representation of the at least one timing constraint, dynamically updating one or more signals related to the at least one timing constraint.

4. The computer-implemented method of claim 1, wherein dynamically updating the graphical representation includes changing a color associated with the at least one timing constraint.

5. The computer-implemented method of claim 3, wherein dynamically updating the one or more signals includes changing a color associated with the one or more signals.

6. The computer-implemented method of claim 1, further comprising:
   displaying at least one differential phase signal associated with the electronic circuit design.

7. A non-transitory computer-readable storage medium for visualizing an electronic circuit design, the computer-readable storage medium having stored thereon instructions that when executed by a machine result in the following operations:
   receiving, at one or more computing devices, the electronic circuit design, wherein the electronic circuit design includes at least one timing constraint;
   identifying the at least one timing constraint;
   displaying, at a graphical user interface associated with the one or more computing devices, the at least one timing constraint and a physical routing associated with the electronic circuit design;
   receiving a user input associated with the electronic circuit design;
   dynamically updating a graphical representation of the at least one timing constraint, in response to the received user input wherein the displaying and the dynamic updating of the graphical representation is performed on a routing canvas in a window of the graphical user interface.

8. The computer-readable storage medium of claim 7, wherein the at least one timing constraint includes all of the timing constraints for a visualized portion of the electronic circuit design.

9. The computer-readable storage medium of claim 7, further comprising:
   in response to dynamically updating the graphical representation of the at least one timing constraint, dynamically updating one or more signals related to the at least one timing constraint.

10. The computer-readable storage medium of claim 9, wherein dynamically updating the one or more signals includes changing a color associated with the one or more signals.

11. The computer-readable storage medium of claim 7, wherein dynamically updating the graphical representation includes changing a color associated with the at least one timing constraint.

12. The computer-readable storage medium of claim 7, further comprising:
   displaying at least one differential phase signal associated with the electronic circuit design.

13. A system for visualizing in an electronic circuit design comprising:
   a computing device having at least one processor configured to receive the electronic circuit design, wherein the electronic circuit design includes at least one timing constraint, the at least one processor further configured to identify the at least one timing constraint and display, at a graphical user interface associated with the one or more computing devices, the at least one timing constraint and a physical routing associated with the electronic circuit design, the at least one processor further configured to receive a user input associated with the electronic circuit design and to dynamically update a graphical representation of the at least one timing constraint, in response to the received user input wherein the displaying and the dynamic updating of the graphical representation is performed on a routing canvas in a window of the graphical user interface.

14. The system of claim 13, wherein the at least one timing constraint includes all of the timing constraints for a visualized portion of the electronic circuit design.

15. The system of claim 13, wherein the at least one processor is further configured to:
   in response to dynamically updating the graphical representation of the at least one timing constraint, dynamically update one or more signals related to the at least one timing constraint.

16. The system of claim 15, wherein dynamically updating the one or more signals includes changing a color associated with the one or more signals.

17. The system of claim 13, wherein dynamically updating the graphical representation includes changing a color associated with the at least one timing constraint.

* * * * *

UNITED STATES PATENT AND TRADEMARK OFFICE
CERTIFICATE OF CORRECTION

| | | |
|---|---|---|
| PATENT NO. | : 8,904,332 B1 | Page 1 of 1 |
| APPLICATION NO. | : 13/782571 | |
| DATED | : December 2, 2014 | |
| INVENTOR(S) | : Brett Allen Neal et al. | |

It is certified that error appears in the above-identified patent and that said Letters Patent is hereby corrected as shown below:

On the title page, item (73) should be corrected to read as follows:

Cadence Design Systems, Inc., San Jose, CA (US)

Signed and Sealed this
Eighth Day of March, 2016

Michelle K. Lee
*Director of the United States Patent and Trademark Office*